Dec. 11, 1951 W. E. ELWELL 2,578,294
PROCESS OF PRODUCING 3,4-DIMETHYL 1-ETHYL BENZENE
Filed July 1, 1948
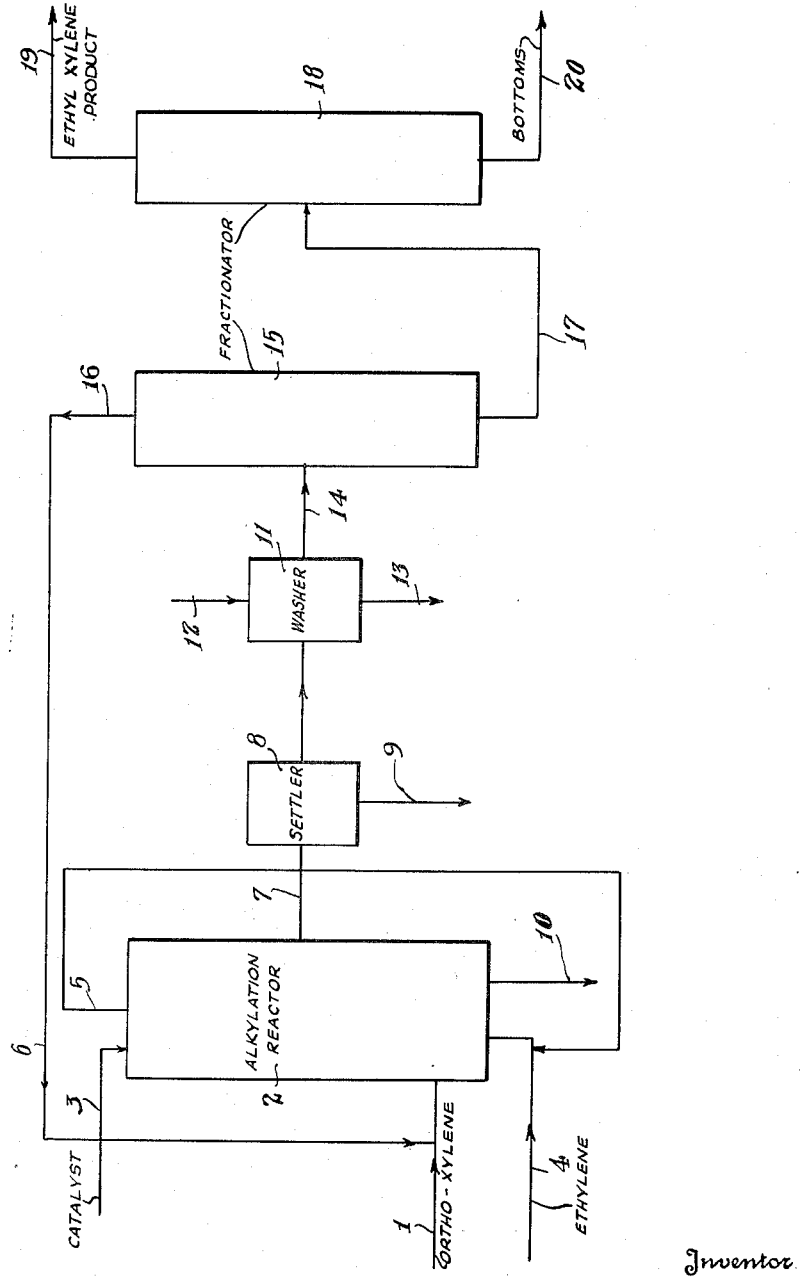
Inventor
William E. Elwell
By
A. L. Snow
Attorneys Patented Dec. 11, 1951

2,578,294

UNITED STATES PATENT OFFICE 2,578,294

PROCESS OF PRODUCING 3,4-DIMETHYL 1-ETHYL BENZENE

William E. Elwell, Berkeley, Calif., assignor to California Research Corporation, San Francisco, Calif., a corporation of Delaware Application July 1, 1948, Serial No. 36,358

3 Claims. (Cl. 260—671)

This invention relates to a process of producing 3,4-dimethyl 1-ethyl benzene.

The vinyl xylenes are homologs to styrene plastics, but have an advantage over styrene plastics in that they produce plastics having heat distortion points (ASTM D648-41T) of about 20° C. higher than the heat distortion points of styrene plastics. When an attempt was made to produce vinyl xylenes by the dehydrogenation of ethyl xylenes it was found that of the ethyl xylenes only the 3,5-dimethyl 1-ethyl benzene and the 3,4-dimethyl 1-ethyl benzene were suitable materials for such a process, for the reason that the other ethyl xylenes such as the 2,3-dimethyl 1-ethyl benzene, the 2,4-dimethyl 1-ethyl benzene, the 2,5-dimethyl 1-ethyl benzene, and the 2,6-dimethyl 1-ethyl benzene, all produced on dehydrogenation methyl indenes. It was also found that because of separation problems arising in the dehydrogenation process the feed material could not be a mixture of the 3,4-dimethyl 1-ethyl benzene and the 3,5-dimethyl 1-ethyl benzene, but should be one only of such compounds.

It is therefore the general object of the present invention to provide a process of producing the 3,4-dimethyl 1-ethyl benzene of substantial purity.

The process of the present invention embodies the production of the desired product by the mono-ethylation of orthoxylene through reaction of the orthoxylene with ethylene. Orthoxylene has two positions to which the desired ethyl group might be attached. When the ethyl group is attached to one of these positions the desired 3,4-dimethyl 1-ethyl benzene results, whereas, on attachment to the other posiiton the 2,3-dimethyl 1-ethyl benzene results. The reactivity of these two positions is substantially equal. It is normally to be expected that any attempt to react ethylene with orthoxylene in the presence of a catalyst would produce a reaction product having substantially equal proportions of these two reaction products. This natural expediency has been verified where the reaction between ethylene and orthoxylene has been carried out using certain catalysts. It has been discovered, however, that when catalysts of the strong Friedel-Crafts type, such as aluminum chloride, are employed, the xylenes and their reaction products may undergo various isomerizing and disproportionating reactions with the resulting production of a reaction mixture containing a very large number of compounds in addition to those normally to be expected from the reaction. Thus, for example, the feed material, orthoxylene, may be by isomerization converted into the other xylenes and thus the reaction product may contain all six of the ethyl xylenes, and there may be also produced diethyl and polyethyl benzenes; and by disproportionating reactions of these compounds with the other components of the reaction mixture there may be produced trimethyl benzenes, diethyl benzenes, toluenes and other products.

The present invention embodies the discovery that a process of producing the 3,4-dimethyl 1-ethyl benzene from the alkylation of orthoxylene can be carried out while substantially eliminating the expected production of 2,3-dimethyl 1-ethyl benzene, while at the same time substantially avoiding isomerization and disproportionation reactions resulting in other undesirable products. Upon alkylation of orthoxylene with the strong Friedel-Crafts type of catalyst, it is possible to substantially confine the production to the 3,4-dimethyl 1-ethyl benzene while substantially avoiding the expected production of the 2,3-dimethyl 1-ethyl benzene. The explanation for the result is not known with certainty, but it is believed that, where mild alkylating conditions are provided, in the presence of the Friedel-Crafts type of catalyst, conditions are established which are favorable to isomerizing any 2,3-dimethyl 1-ethyl benzene produced by the process to the desired 3,4-dimethyl 1-ethyl benzene. Apparently, the ethyl group undergoes isomerization under milder conditions than the methyl groups, so that the methyl groups remain fixed, while the ethyl group shifts its position, and further it appears that the ethyl groups adjacent to methyl, that is, in the 1-ethyl 2,3-dimethyl, isomerize preferentially as compared to the ethyl group in the 1-ethyl 3,4-dimethyl compound. It has been found that under more severe alkylating conditions, in the presence of such Friedel-Crafts type of catalyst, isomerization of the methyl groups does occur so that under such more severe alkylating conditions neither of the expected ethyl xylenes are produced in large quantities, but in place the principal product is the 3,5-dimethyl 1-ethyl benzene.

The 3,4-dimethyl 1-ethyl benzene is a more desirable product than the 3,5-dimethyl 1-ethyl benzene as it gives a vinyl xylene polymer of a higher softening point.

In order to provide a process of alkylating orthoxylene with ethylene using the Friedel-Crafts type catalyst, in which process the desired isomerization to the 3,4-dimethyl 1-ethyl benzene may occur to the exclusion of other undesired isomerization and disproportionation reactions, it is found that the alkylating conditions established should be mild. That is to say, it has been found that while higher temperatures promote alkylation and allow the use of shorter reaction times, the general effect of increasing temperature is to accelerate certain undesirable isomerization and disproportionation reactions to a greater extent than high temperature accelerates the desired alkylation reactions. The effect of increased reaction time is likewise to promote alkylation, but also may increase to a greater degree certain undesired isomerization and disproportionation reactions. There is, however, a limited temperature range at which the reaction may be carried out. Thus, for example, at temperatures of about 40° C. and catalyst concentration of about 2 mole percent on xylene, the reaction becomes erratic. That is to say, the ethylene may be absorbed for a short time in the reaction mixture and then at other periods of time pass through the reaction mixture without change. Temperatures of about 45° to 50° C. appear to be near the lower limit at which alkylation may be maintained. Temperatures of about 50° C., using the reaction time of about 18 hours and the catalyst concentration mentioned, appear satisfactory for the desired alkylation, particularly if the molar ratio of orthoxylene to ethylene introduced in the reaction mixture is maintained substantially over 1. Higher temperatures of alkylation may be used in the process of the present invention provided the time of treatment is properly reduced. At temperatures, for example, of 90° to 95° C., using a molar ratio of orthoxylene to ethylene of about 2:1, a reaction time of about .5 hour, and a catalyst concentration of about 2 mole percent based on xylene, a suitable alkylation treatment may be established. Thus, temperature and time of treatment are in a sense reciprocally acting alkylating conditions, higher temperatures necessitating the use of lower times of reaction and lower temperatures necessitating the use of longer times of reaction if the desired alkylation is to be effected while minimizing the undesired isomerization and disproportionation reactions. In general, at the temperature and pressure chosen for the reaction it is preferable that the time of treatment should be carefully regulated so as to be comparable to the time required for nearly complete absorption of the ethylene and an excess of xylene over ethylene should be maintained. Likewise, the catalyst concentration, i. e., the moles of catalyst per mole of xylene, is important in controlling the reaction, the lower catalyst concentration representing milder alkylating conditions. A catalyst concentration of 0.01 causes the reaction to become erratic, that is to say, the absorption of ethylene may not continue in the process. Catalyst concentrations of about 0.015 to 0.035 appear satisfactory, the preferred concentrations being 0.02 to 0.025, whereas higher concentrations of catalyst such as 0.05 appear to favor an undesired isomerization to the 3,5-dimethyl 1-ethyl benzene.

The process of the present invention will be fully understood from the following description of a preferred example of the invention as given in connection with the accompanying drawing.

In the drawing the figure represents a diagrammatic view of a suitable apparatus in which the process of the present invention may be conducted, in which drawing, however, for the sake of clarity and simplicity, there have been omitted certain details such as pumps, valves, measuring means, heat exchangers, coolers, refluxing apparatus, flow meters, and like appurtenances, as will be readily supplied by one skilled in the art.

In the process as illustrated in the drawing, the orthoxylene enters the alkylating zone 2 through the line 1. A catalyst of the Friedel-Crafts type, such as aluminum chloride, in controlled amounts with respect to the total xylene introduced into the alkylation zone, as more particularly described and exemplified hereafter, enters the zone 2 by the line 3. Ethylene gas, which may be accompanied by dry HCl if desired, for the purpose of activating the catalyst, is introduced into the alkylating zone 2 through the line 4. The gaseous ethylene is introduced in amounts or proportions controlled with respect to the xylene introduced as hereafter described. In the zone 2, a volume of liquid is maintained of sufficient size relative to the feed rates as to provide the desired reaction time. In zone 2, contact between the catalyst, gas and liquid may be effected without the employment of mechanical devices, although they may be installed and operated as necessary to cause rapid ethylene absorption and reaction. Unreacted ethylene is allowed to leave zone 2 through line 5 and is conveniently reintroduced into the alkylation zone through line 4. The principal stream of liquid products of the reaction zone leaves through line 7 and enters a separator or settler 8 where oil immiscible catalyst collects as a bottom layer and is removed through line 9; to the extent that a spent or partially spent catalyst layer is allowed to collect in the bottom of the zone 2, depending upon the flow rates, turbulence and dimensions of the zone, it may be removed through line 10 continuously or periodically.

It is normally desirable, although not necessary, to remove the acid reacting components from the liquid reaction product by washing with water or aqueous alkaline solution, such as diluted sodium hydroxide or carbonate, and for this purpose the reaction products are passed from settler 8 into vessel 11. Water or alkaline water solutions enter vessel 11 through line 12 and may be drawn off through line 13.

Subsequent to washing, the liquid alkylation reaction products enter the fractionating column 15 through line 14. The column 15 operates as a topping still and functions to remove the unreacted orthoxylene as an overhead which leaves the column 15 through line 16, and is returned to line 6 after condensation (by means not shown) to the alkylation zone 2 for reaction with ethylene and increased ethyl xylene production. The produced ethyl xylenes, together with any polyethyl xylenes formed, leave column 15 as a liquid through line 17 and are carried to column 18. In column 18 the produced ethyl xylenes are removed as overhead through line 19 and higher boiling reaction products removed through line 20 as a bottom.

The alkylation reaction in the alkylating zone 2 is generally carried out using a temperature range of about 45° C. to 100° C. and at a time of reaction in the alklating zone of from about 0.25 to 18 hours, the shorter reaction times being applied to the higher temperatures of alkylation and the longer reaction times being applied to the lower alkylating temperatures. The alkylation treatment is ordinarily carried out at atmospheric pressure for economy in operation, although pressure may be employed in the alkylating zone to facilitate the reaction. The ratio of AlCl₃ catalyst to xylene is generally around 0.02 to 0.025 mole of anhydrous AlCl₃ per mole of xylene fed to the reaction zone, although as stated before, a somewhat wider variation may be utilized. However, a catalyst concentration of as high as 0.05 generally results in undesired production of the 3,5-dimethyl 1-ethyl benzene, whereas concentrations as low as about .01 are insufficient generally to maintain the reaction.

In general, the aluminum chloride concentration should be maintained as low as possible, consistent with obtaining a satisfactory alkylation rate, in order to minimize undesired isomerization and disproportionation reactions. The ratio of xylene to ethylene fed to the alkylation zone should be above 1 and ordinarily in the neighborhood of 1.5 to 2, as an attempt to achieve complete alkylation of the xylene in one pass through the process will normally lead to an undesirable increase in the polyalkylation and the isomerization and disproportionation reactions.

The following examples of test operation will illustrate the nature of the process. In one test operation of the process using a catalyst concentration of 0.01 mole catalyst per mole of xylene, a temperature of 90° C. was found impossible to maintain. The reaction and absorption of olefin stopped at a mole ratio of 0.07. Increasing the catalyst concentration to 0.025 and operating at 90° C. for 0.58 hour at atmospheric pressure, with a mole ratio of ethylene to xylene of 0.58, produced an ethyl xylene product taken from line 19, which product analyzed about 90% 3,4-dimethyl 1-ethyl benzene, the remainder being about 5% 2,3-dimethyl 1-ethyl benzene and 5% 3,5-dimethyl 1-ethyl benzene. Substantially similar results are obtained with other catalyst concentrations, such as 0.02. When the catalyst concentration of 0.05 mole of catalyst per mole of xylene was employed at a temperature of about 93° C. with a time of reaction of 9 hours at atmospheric temperature, and a mole ratio of ethylene to xylene employed of 0.83, it was found that 50% of the reaction product was a 3,5-dimethyl 1-ethyl benzene, the composition of the remainder not being determined.

The process of the present invention thus allows, when proper mild alkylating conditions are employed, the conversion of orthoxylene to a produced ethyl xylene product having around 85 to 95% of the desired 3,4-dimethyl 1-ethyl benzene.

The suppression of the production of the unwanted 2,3-dimethyl 1-ethyl benzene is substantially complete, while the isomerization to other products, such as the 3,5-dimethyl 1-ethyl benzene, is substantially avoided.

While the specific example of the process herein described is well adapted to carry out the objects of the invention, it will be understood by those skilled in the art that various modifications and changes may be made, and this invention is of the scope set forth in the appended claims.

I claim:

1. A process of producing 3,4-dimethyl 1-ethyl benzene while isomerizing in major part any 2,3-dimethyl 1-ethyl benzene to such desired product and substantially avoiding isomerizing reactions resulting in the formation of other ethyl xylenes which comprises reacting orthoxylene with ethylene in a molar ratio of xylene to ethylene of about 2 to 1 in a reaction zone in the presence of an aluminum chloride catalyst under mild alkylating conditions conducted at a temperature of from about 90-95° C. and for a time of treatment of about 0.5 hour with a molar ratio of catalyst to xylene feed of about 0.02, so as to form in addition to unreacted o-xylene the desired 3,4-dimethyl 1-ethyl benzene while substantially inhibiting the formation in the reaction product of other undesired ethyl xylenes, and separating the 3,4-dimethyl 1-ethyl benzene from the reaction product.

2. A process for producing 3,4-dimethyl 1-ethyl benzene by ethylation of ortho-xylene while substantially avoiding isomerization of the methyl groups and production of isomeric dimethyl ethyl benzenes, which comprises contacting ortho-xylene with ethylene in the presence of an aluminum chloride catalyst in a reaction zone, maintaining in the reaction zone a mole ratio of ortho-xylene to ethylene greater than 1, a temperature in the range of from about 90 to about 95° C. and a catalyst concentration in the range of from about 0.015 to about 0.035 mole of catalyst per mole of xylene and maintaining the reactants and the catalyst in contact for a period of about 0.5 hour.

3. A process for producing 3,4-dimethyl 1-ethyl benzene by ethylation of ortho-xylene while substantially avoiding isomerization of the methyl groups and production of isomeric dimethyl ethyl benzenes, which comprises contacting ortho-xylene with ethylene in the presence of an aluminum chloride catalyst in the reaction zone, maintaining in the reaction zone a mole ratio of ethylene to ortho-xylene of about 0.58, a temperature of about 90° C. and a catalyst concentration of about 0.025 mole of catalyst per mole of xylene and maintaining the reactants and the catalyst in contact for a period of about 0.5 hour.

WILLIAM E. ELWELL.

REFERENCES CITED

The following references are of record in the file of this patent:

UNITED STATES PATENTS

| Number | Name | Date |
|--------|------|------|
| 2,403,785 | Britton et al. | July 9, 1946 |
| 2,425,559 | Passino et al. | Aug. 12, 1947 |
| 2,429,691 | Johnson et al. | Oct. 28, 1947 |
| 2,443,247 | Howell | June 15, 1948 |

OTHER REFERENCES

Norris et al., "The Rearrangement of Xylenes by Aluminum Chloride," J. A. C. S., 61, 2131-4 (1939) (4 pages).